UNITED STATES PATENT OFFICE 1,945,923

4.5 - DIMETHYL-7-CHLORO-OXYTHIONAPH-THENE AND ITS INDIGOID DERIVATIVES

Norbert Steiger, Frankfort-on-the-Main, Germany, assignor to General Aniline Works, Inc., New York, N. Y., a corporation of Delaware No Drawing. Application June 2, 1931, Serial No. 541,745, and in Germany June 7, 1930

3 Claims. (Cl. 260—53)

My present invention relates to 4.5-dimethyl-7-chloro-oxythionaphthene and its derivatives especially indigoid dyestuffs derived therefrom.

These valuable compounds are all obtained from ortho-xylene which has not hitherto found a technical application of any importance though it can be easily separated from the technical mixture with its isomers.

These compounds correspond to the general formula

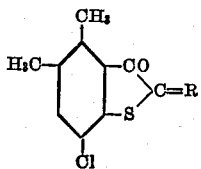

(wherein R means $H_2$, O,N-aryl or a component capable of yielding indigoid dyestuffs with oxythionaphthenes or their anils). These compounds are partially valuable components for the manufacture of indigoid dyestuffs, partially they are indigoid vat dyestuffs themselves distinguished particularly by good fastness to kier boiling with sodium carbonate solution.

In order to produce the 4.5-dimethyl-7-chloro-oxythionaphthene there are available the following two series of reaction steps:

(1) The sulfate of 4-amino-1.2-dimethyl-benzene, which can be obtained by nitrating ortho-xylene and reducing the nitro-product, is transformed into 1.2-dimethyl-4-amino-benzene-5-sulfonic acid according to the so-called baking process. According to Sandmeyer's method the amino group is then replaced by chlorine with the formation of the 1.2-dimethyl-4-chloro-benzene-5-sulfonic acid, which latter compound is transformed in the known manner through the sulfochloride, followed by reduction into the 1.2-dimethyl-4-chlorobenzene-5-mercaptan.

(2) The same 4-amino-1.2-dimethylbenzene is chlorinated and the amino group is replaced in the known manner by the xanthogenic acid ester group. By saponification of the compound thus formed the same mercapto compound is obtained.

By the action of monochloracetic acid the mercaptan obtained according to either of the above two series of steps yields 1.2-dimethyl-4-chloro-benzene-5-thioglycolic acid which by ring closure is transformed into 4.5-dimethyl-7-chloro-oxythionaphthene.

The single steps of this combined process may be illustrated by the following scheme of formulæ:

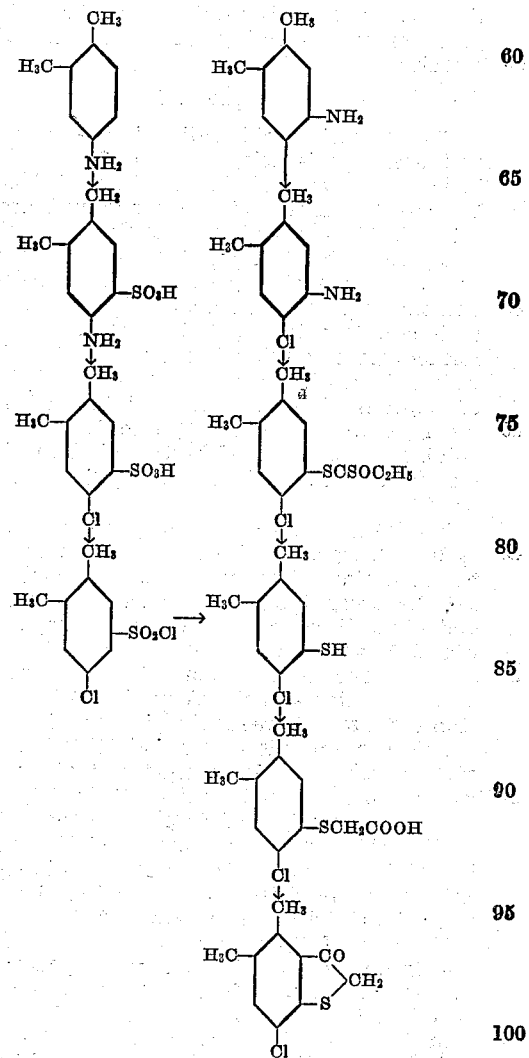

The new 4.5-dimethyl-7-chloro-oxythionaphthene crystallizes for example from glacial acetic acid in colorless needles of melting point 160° C. When treated with an oxidizing agent the symmetrical thioindigo derivative is formed which dyes reddish violet shades of good fastness to kier boiling with sodium carbonate solution.

By condensing 4.5-dimethyl-7-chloro-oxythionaphthene with cyclic diketones or their derivatives such as isatins and naphthisatins, their chlorides and arylides, or with diketo-dihydro-thionaphthenes and diketo-dihydro-naphtho-thionaphthenes and their anils, with ace-naphthenequinone, or by condensing 4.5-dimethyl-7-chloro-oxythionaphthene-2-anils with bodies containing a reactive methylene group, mixed thioindigoid dyestuffs are formed dyeing the fiber from the vat pink red to blue shades distinguished by brightness and good fastness to kier boiling with sodium carbonate solution (cf. test No. 15, page 15 of "Verfahren, Normen und Typen für die Prüfung der Echtheitseigenschaften von Färbungen auf Baumwolle, Wolle, Seide, Viscosekunstseide und Acetatseide" published by the "Echtheitskommission" of the "Fachgruppe für Chemie der Farben- und Textilindustrie" of the Verein Deutscher Chemiker, fourth edition, 1928, Verlag Chemie, G. m. b. H., Berlin W. 10).

In order to further illustrate my invention the following examples are given the parts being by weight; but I wish it however to be understood that my invention is not limited to the particular products nor reacting conditions mentioned therein.

*Example 1*

The sulfuric acid salt of 1.2-dimethyl-4-aminobenzene is baked at 190° C. for about 8 hours. 170 parts of the 1.2-dimethyl-4-aminobenzene-5-sulfonic acid thus obtained are dissolved in 100 parts of 10 n caustic soda solution and 1000 parts of water. The solution is mixed with a solution of 56 parts of sodium nitrite and and the mixture is introduced into 480 parts of hydrochloric acid and 1000 parts of ice. The formed diazo solution is mixed at 45 to 50° C. with a hydrochloric acid solution of 165 parts of cuprous chloride. The solution of 1.2-dimethyl-4-chloro-benzene-5-sulfonic acid thus obtained is precipitated by the addition of common salt. The sodium salt is filtered off and dried.

100 parts of this sodium salt are molten at 90 to 100° C. together with 100 parts of phosphorus pentachloride. The fusion mass is poured into ice, the precipitated sulfochloride is filtered off and then stirred at 100° C. for about 10 hours with 600 parts of 50% sulfuric acid and 120 parts of zinc. The reduction liquor is diluted with 1000 parts of water and the formed 1.2-dimethyl-4-chloro-benzene-5-mercaptan is filtered off.

This mercaptan is dissolved at 40° C. in 50 parts of 10 n caustic soda solution and 400 parts of water and then condensed at 40 to 50° C. with an alkaline solution of 40 parts of monochloro-acetic acid. The solution, filtered if necessary, is acidified, the precipitated 1.2-dimethyl-4-chloro-benzene-5-thioglycolic acid is filtered off, washed and dried. It melts at 70° C.

20 parts of 1.2-dimethyl-4-chloro-benzene-5-thioglycolic acid are introduced at —10 to —15° C. into 200 parts of chloro-sulfonic acid and the mass is stirred at this temperature for about 5 hours. Then it is poured into ice and the precipitated 4.5-dimethyl-7-chloro-oxythionaphthene corresponding to the following formula

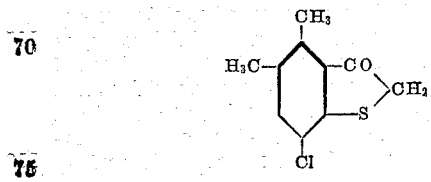

is filtered off. It crystallizes from glacial acetic acid in colorless needles melting at 160° C.

The same oxythionaphthene is obtained by treating 1.2-dimethyl-4-chloro-benzene-5-thioglycolic acid chloride with aluminum chloride.

*Example 2*

100 parts of 1.2-dimethyl-4-chloro-benzene-5-thioglycolic acid, described in Example 1, are dissolved at 0-5° C. in 300 parts of chlorosulfonic acid. The mass is stirred for about 12 hours, the temperature being gradually raised to 20° C. The dark green solution is poured into ice-water. Thereby 4.5.4'.5'-tetramethyl-7.7'-dichloro-thioindigo separates as a red crystalline precipitate.

The same dyestuff is obtained by treating 4.5-dimethyl-7-chloro-oxythionaphthene, described in Example 1, in an alkaline solution with potassium ferricyanide or another suitable oxidizing agent.

It corresponds to the following formula

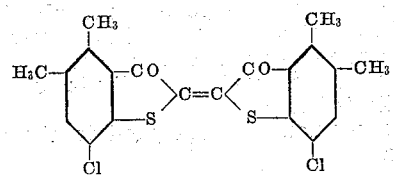

and shows when dry a claret red color. Its solution in monohydrate is green. With a caustic soda lye and hydrosulfite it forms a light yellow vat. Cotton is dyed, and printed bright red-violet shades of an excellent fastness to boiling; in this direction as well as to the clearness of the shade the dyestuff surpasses the closely related 5.5'-dichloro-7.7'-dimethyl-thioindigo.

*Example 3*

66 parts of 4.5-dimethyl-7-chloro-oxythionaphthene and 99 parts of 4-methyl-6-chloro-oxy-thionaphthene-2-anil are stirred under reflux for about 6 hours at a temperature of 115° C. with 1,800 parts of glacial acetic acid. The unsymmetrical thioindigo thus obtained separates as a bluish red crystalline precipitate corresponding to the following formula

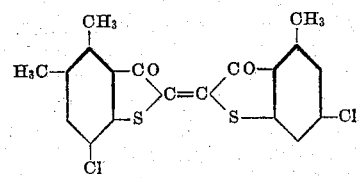

It dissolves in monohydrate with a green color, forms a yellow vat and dyes the fiber bright pink shades. The dyeings and printings obtained are distinguished by an excellent fastness to boiling.

By condensing 4.5-dimethyl-7-chloro-oxythio-naphthene-2-anil with 4-methyl-6-chloro-oxy-thionaphthene the same dyestuff is obtained.

*Example 4*

33 parts of 5.7-dibromo-isatine and 24 parts of phosphorus pentachloride are stirred for 2 hours at 100° C. with 80 parts of chlorobenzene and the solution thus obtained is condensed at a temperature of 85° C. with 22 parts of 4.5-dimethyl-7-chloro-oxythionaphthene, dissolved in 80 parts of chlorobenzene. The dyestuff thus obtained corresponding to the formula

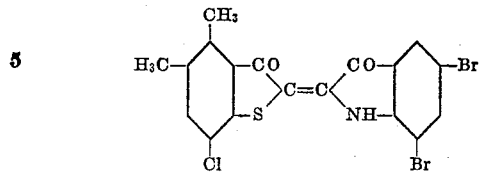

has a violet color. The solution in monohydrate is green. It forms a gold-yellow vat and dyes the fiber violet shades.

*Example 5*

13.8 parts of 4.5-dimethyl-7-chloro-oxythionaphthene are condensed in 200 parts of chlorobenzene at 80 to 90° C. with a solution of 4-methyl-5-chloro-7-methoxy - isatine - chloride, which is obtained by heating to 100 to 105° C. 15.8 parts of 4-methyl-5-chloro-7-methoxy-isatine and 14.5 parts of phosphorus pentachloride in 240 parts of chlorobenzene. The dyestuff separated in form of dark blue crystals is sucked off and dried. It corresponds to the following formula

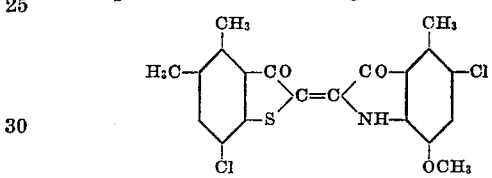

Its solution in concentrated sulfuric acid is bluish green. The dyestuff forms a brownish yellow vat and dyes and prints cotton bright blue shades of an excellent fastness to boiling.

I claim:

1. As new compounds the oxy-thionaphthene derivatives of the general formula:

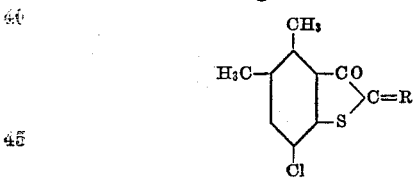

in which formula R means H₂ or a radical of the formula:

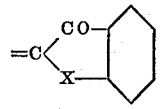

(wherein X means S or NH and the benzene nucleus may contain halogen atoms or a methyl-or methoxy group).

2. As a new compound the 4.5-dimethyl-7-chloro-oxythionaphthene of the formula:

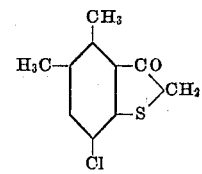

which compound represents when recrystallized from glacial acetic acid colorless needles melting at 160° C.

3. As a new compound the 4.5.4'.5'-tetramethyl-7.7'-dichloro-thioindigo of the formula:

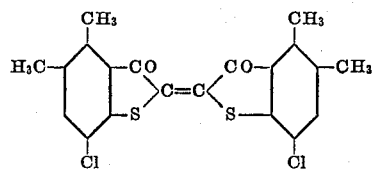

which compound shows when dry a claret red color, dissolves in monohydrate with a green color and forms with a caustic soda lye and hydrosulfite a light yellow fat from which cotton is dyed and printed bright red-violet shades of an excellent fastness to boiling.

NORBERT STEIGER.